United States Patent
Suciu et al.

(10) Patent No.: US 10,526,910 B2
(45) Date of Patent: ***Jan. 7, 2020

(54) GAS TURBINE ENGINE NACELLE VENTILATION MANIFOLD FOR COOLING ACCESSORIES

(71) Applicant: United Technologies Corporation, Farmington, CT (US)

(72) Inventors: Gabriel L. Suciu, Glastonbury, CT (US); Jesse M. Chandler, South Windsor, CT (US); Federico Papa, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,377

(22) Filed: Aug. 9, 2018

(65) Prior Publication Data

US 2018/0363492 A1     Dec. 20, 2018

Related U.S. Application Data

(63) Continuation of application No. 15/111,553, filed as application No. PCT/US2015/011944 on Jan. 20, 2015.

(Continued)

(51) Int. Cl.
*F02C 7/18* (2006.01)
*F01D 17/14* (2006.01)
(Continued)

(52) U.S. Cl.
CPC .......... *F01D 17/145* (2013.01); *F01D 25/26* (2013.01); *F02C 3/04* (2013.01); *F02C 7/18* (2013.01);
(Continued)

(58) Field of Classification Search
CPC ...... F02C 7/04; F02C 7/12; F02C 7/16; F02C 7/18; F02C 7/185; F02C 9/18; F02C 6/08;
(Continued)

(56) References Cited

U.S. PATENT DOCUMENTS

| | | |
|---|---|---|
| 4,773,212 A | 9/1988 | Griffin et al. |
| 5,202,403 A | 4/1993 | Doering |

(Continued)

FOREIGN PATENT DOCUMENTS

| | | |
|---|---|---|
| EP | 1918561 A2 | 5/2012 |
| EP | 2497908 A2 | 9/2012 |

(Continued)

OTHER PUBLICATIONS

International Search Report and Written Opinion for PCT Application No. PCT/US2015/011944 dated Apr. 20, 2015.

(Continued)

*Primary Examiner* — William H Rodriguez
(74) *Attorney, Agent, or Firm* — Carlson, Gaskey & Olds, P.C.

(57) ABSTRACT

A gas turbine engine comprises a core engine housing. A nacelle is positioned radially outwardly of the core engine housing. An outer bypass housing is positioned outwardly of the nacelle. There is at least one accessory to be cooled positioned in a chamber radially between the core engine housing and the nacelle. A manifold delivers cooling air into the chamber, and extends ng circumferentially about a central axis of the core engine. The nacelle has an asymmetric flow cross-section across a circumferential extent.

13 Claims, 2 Drawing Sheets

Related U.S. Application Data

(60) Provisional application No. 61/939,296, filed on Feb. 13, 2014.

(51) Int. Cl.
*F01D 25/26* (2006.01)
*F02C 3/04* (2006.01)
*F02C 9/18* (2006.01)

(52) U.S. Cl.
CPC ............ *F02C 9/18* (2013.01); *F05D 2220/32* (2013.01); *F05D 2240/35* (2013.01); *F05D 2260/608* (2013.01); *Y02T 50/675* (2013.01)

(58) Field of Classification Search
CPC ..... F02C 7/32; F02K 3/06; F02K 3/02; F05D 2260/608; F01D 25/24; F01D 25/26
See application file for complete search history.

(56) References Cited

U.S. PATENT DOCUMENTS

| | | | |
|---|---|---|---|
| 5,261,228 A | | 11/1993 | Shuba |
| 5,279,109 A | | 1/1994 | Liu et al. |
| 5,357,742 A | * | 10/1994 | Miller .................. B64D 33/08 244/53 B |
| 7,624,581 B2 | | 12/2009 | Moniz |
| 9,151,224 B2 | | 10/2015 | Suciu et al. |
| 2002/0184871 A1 | | 12/2002 | Kolman et al. |
| 2003/0024233 A1 | * | 2/2003 | Snyder .................. B01D 45/08 60/39.092 |
| 2007/0086887 A1 | * | 4/2007 | Pezzetti, Jr. ............ F01D 11/24 415/173.1 |
| 2007/0245711 A1 | | 10/2007 | Stretton |
| 2007/0264120 A1 | | 11/2007 | Amiot et al. |
| 2008/0095611 A1 | | 4/2008 | Storage et al. |
| 2010/0247297 A1 | * | 9/2010 | Legare ................... F01D 11/24 415/173.1 |
| 2011/0239660 A1 | * | 10/2011 | Suciu ..................... F01D 15/12 60/784 |
| 2012/0227375 A1 | | 9/2012 | Badcock et al. |
| 2013/0156541 A1 | * | 6/2013 | Eleftheriou ............. F01D 11/20 415/1 |
| 2013/0192254 A1 | | 8/2013 | Campbell et al. |
| 2013/0239584 A1 | | 9/2013 | Suciu et al. |
| 2013/0291514 A1 | | 11/2013 | Suciu et al. |
| 2014/0119903 A1 | * | 5/2014 | Suciu ..................... F02C 7/052 415/177 |
| 2014/0366555 A1 | * | 12/2014 | Beier ....................... F02C 7/20 60/796 |
| 2015/0292408 A1 | * | 10/2015 | Suciu ..................... F02C 7/052 415/121.2 |
| 2017/0044991 A1 | * | 2/2017 | Suciu .................... F01D 25/162 |
| 2017/0191420 A1 | * | 7/2017 | Clarke ..................... F02C 7/18 |
| 2018/0073435 A1 | * | 3/2018 | Chen ....................... F02C 6/08 |

FOREIGN PATENT DOCUMENTS

| | | | |
|---|---|---|---|
| EP | 2543851 A1 | | 1/2013 |
| GB | 1310810.5 | * | 6/2013 |

OTHER PUBLICATIONS

Supplementary European Search Report for European Application No. 15749596.1 dated Sep. 4, 2017.

* cited by examiner

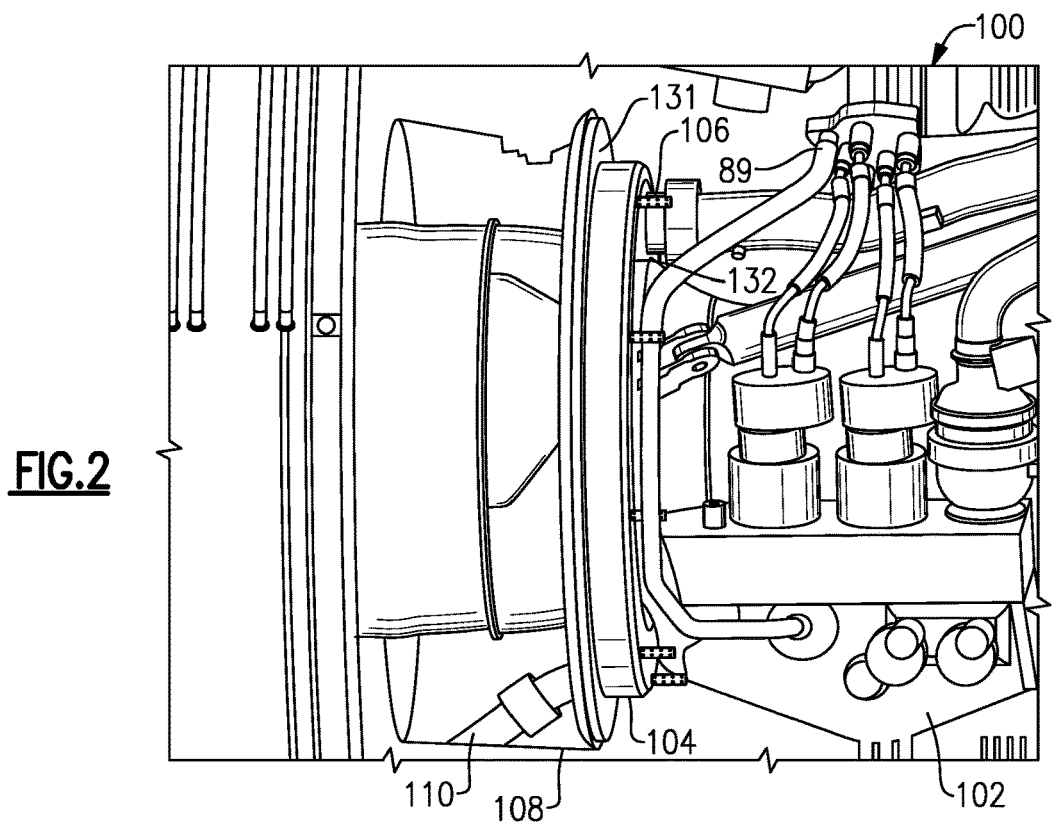
FIG.2
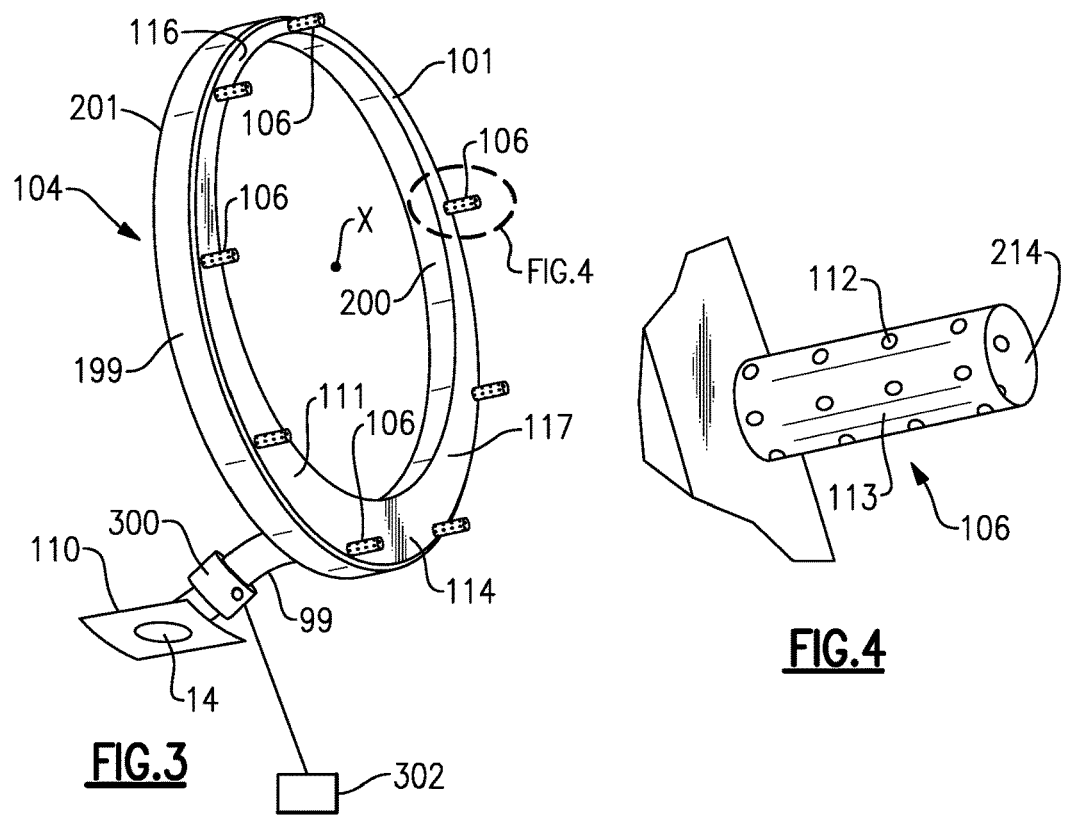
FIG.3
FIG.4

GAS TURBINE ENGINE NACELLE VENTILATION MANIFOLD FOR COOLING ACCESSORIES

CROSS-REFERENCE TO RELATED APPLICATION

This application is a continuation of U.S. patent application Ser. No. 15/111,553 filed Jul. 14, 2016, which is a National Phase Application of International Application No. PCT/US2015/011944 filed Jan. 20, 2015, which claims priority to U.S. Provisional Patent Application No. 61/939,296, filed Feb. 13, 2014.

BACKGROUND OF THE INVENTION

This application relates to a ventilation manifold having a variable cross-sectional flow area across a circumference of an associated engine.

Gas turbine engines are known and, typically, include a fan delivering air into a bypass duct. The bypass duct is defined outwardly of a core housing. The core housing has an upstream end, typically, known as a nacelle. Cooling air may be supplied within the core housing and across various accessories that are positioned within the core housing. As an example, various fluid components must be cooled. Also, an accessory gearbox may be positioned within the housing and must be cooled.

An inner core housing houses a compressor, a combustor and a turbine section. The amount of air delivered into the bypass duct provides a propulsion flow in addition to an exhaust power downstream of the core engine and which powers an associated aircraft.

The cooling air moving inwardly of the nacelle may be tapped from the bypass flow and, thus, the volume tapped reduces the efficiency or amount of propulsion provided for a given amount of fuel being burned. It is, of course, desirable to increase the efficiency.

The cooling load is not uniform across a circumference of the interior of the nacelle. Moreover, the volume of air distributed into the nacelle at locations closer to an inlet will be greater.

In known manifolds, the flow area has typically been uniform across the circumference of the engine.

SUMMARY OF THE INVENTION

In a featured embodiment, a gas turbine engine comprises a core engine housing. A nacelle is positioned radially outwardly of the core engine housing. An outer bypass housing is positioned outwardly of the nacelle. There is at least one accessory to be cooled positioned in a chamber radially between the core engine housing and the nacelle. A manifold delivers cooling air into the chamber, and extends ng circumferentially about a central axis of the core engine. The nacelle has an asymmetric flow cross-section across a circumferential extent.

In another embodiment according to the previous embodiment, a plurality of flow distribution tubes extend from the manifold and into the chamber.

In another embodiment according to any of the previous embodiments, the plurality of flow distribution tubes includes an exit opening at an end of the flow distribution tubes and a plurality of openings formed in a sidewall.

In another embodiment according to any of the previous embodiments, the manifold is defined by having a radially outer sidewall and an inner wall, with a rear wall and a radially inner wall defined by a separate housing member.

In another embodiment according to any of the previous embodiments, an inlet tube for the manifold captures air from a bypass duct defined between the outer bypass housing and the nacelle.

In another embodiment according to any of the previous embodiments, the manifold has a greater cross-sectional area associated with a circumferential location where the inlet tube enters the manifold, and has a lesser cross-sectional area at locations spaced circumferentially from the area of greater flow cross-sectional area.

In another embodiment according to any of the previous embodiments, the manifold delivers cooling air over at least two of the accessories. A first of the accessories is associated with the area of greater cross-sectional area, and includes an accessory gearbox. A second accessory is associated with the area of lesser cross-sectional area. The second accessory is a fluid component.

In another embodiment according to any of the previous embodiments, a valve is controlled to modulate the volume of air delivered as cooling air into the chamber from the manifold.

In another embodiment according to any of the previous embodiments, the valve is open to allow greater airflow to cool the at least one component during high pressure operation of an associated gas turbine engine and is modulated to reduce the airflow at lesser power portions of the gas turbine engine.

In another embodiment according to any of the previous embodiments, the valve is located on an inlet tube leading into the manifold.

In another embodiment according to any of the previous embodiments, the manifold is defined by having a radially outer sidewall and an inner wall. A rear wall and a radially inner wall are defined by a separate housing member.

In another embodiment according to any of the previous embodiments, an inlet tube for the manifold captures air from a bypass duct defined between the outer bypass housing and the nacelle.

In another embodiment according to any of the previous embodiments, the manifold has a greater cross-sectional area associated with a circumferential location where the inlet tube enters the manifold, and has a lesser cross-sectional area at locations spaced circumferentially from the area of greater flow cross-sectional area.

In another embodiment according to any of the previous embodiments, the manifold delivers cooling air over at least two of the accessories. A first of the accessories is associated with the area of greater cross-sectional area, and includes ng an accessory gearbox. A second accessory is associated with the area of lesser cross-sectional area. The second accessory is a fluid component.

In another embodiment according to any of the previous embodiments, a valve is controlled to modulate the volume of air delivered as cooling air into the chamber from the manifold.

In another embodiment according to any of the previous embodiments, the valve is open to allow greater airflow to cool the at least one component during high pressure operation of an associated gas turbine engine and is modulated to reduce the airflow at lesser power portions of the gas turbine engine.

In another embodiment according to any of the previous embodiments, the valve is located on an inlet tube leading into the manifold.

In another embodiment according to any of the previous embodiments, a compressor and a turbine are mounted within the core engine housing.

In another featured embodiment, a gas turbine engine comprises a core engine housing. A nacelle is positioned radially outwardly of the core engine housing, and an outer bypass housing is positioned outwardly of the nacelle. There is at least one accessory to be cooled positioned in a chamber radially between the core engine housing and the nacelle. A manifold delivers cooling air into the chamber. A valve is controlled to modulate the volume of air delivered as cooling air into the chamber from the manifold.

In another embodiment according to the previous embodiment, the valve is open to allow greater airflow to cool the at least one component during high pressure operation of an associated gas turbine engine and is modulated to reduce the airflow at lesser power portions of the gas turbine engine.

In another embodiment according to any of the previous embodiments, the valve is located on an inlet tube leading into the manifold.

These and other features may be best understood from the following drawings and specification.

BRIEF DESCRIPTION OF THE DRAWINGS

FIG. 2 shows the location of a nacelle ventilation manifold.

FIG. 3 shows a detail of the manifold.

FIG. 4 shows a portion of a manifold.

DETAILED DESCRIPTION

Figure 1:
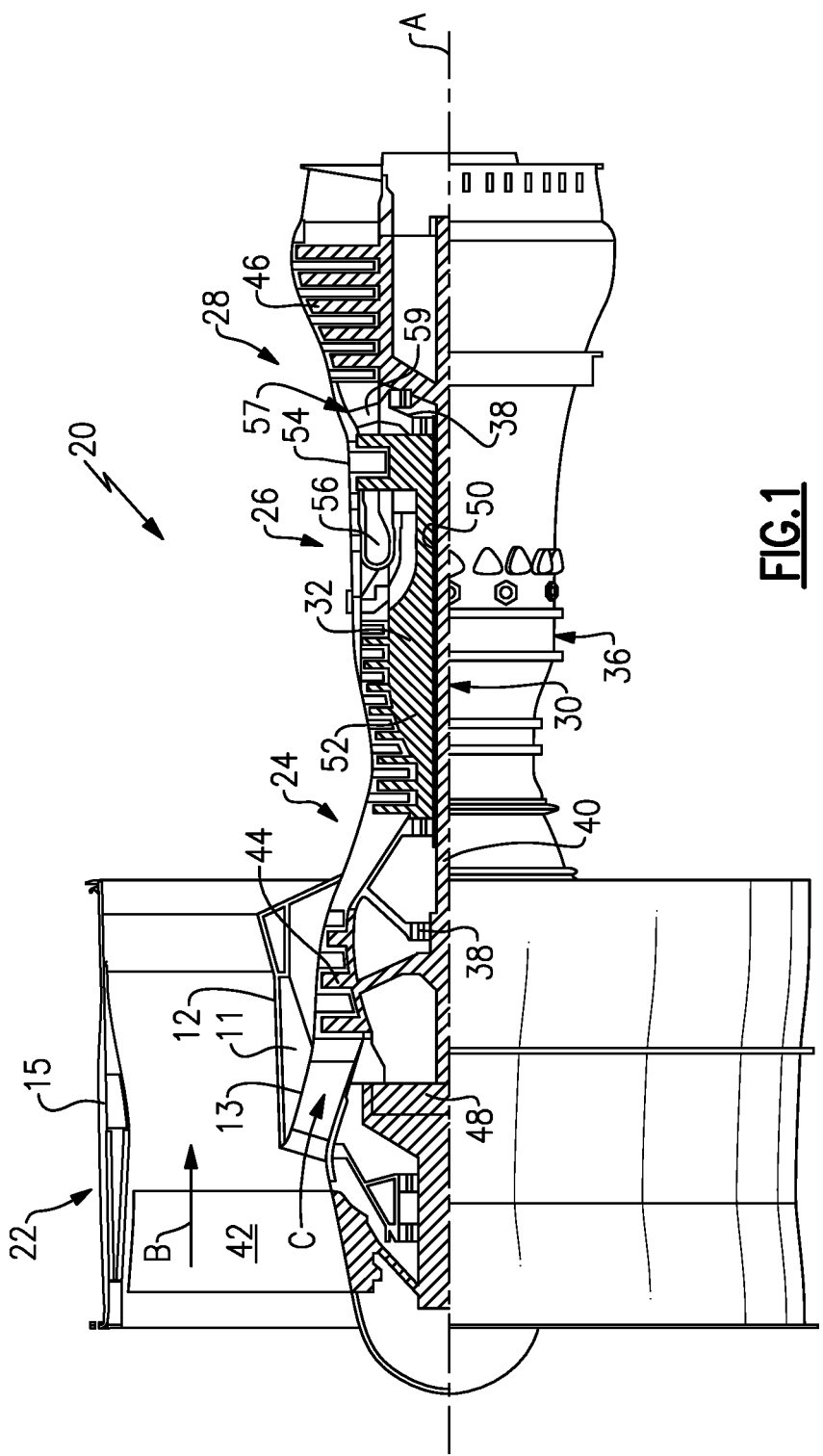
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

FIG. 2 shows an interior chamber 100 inward of a nacelle housing 108. This may be roughly the chamber identified by 11 in FIG. 1, and between nacelle housing 12 and core housing 13. An inlet pipe 110 has an opening 14 (see FIG. 3) that captures air from the bypass duct (B) and delivers it into a body of a manifold 104. The air is then distributed outwardly through a plurality of flow distribution tubes 106. The air delivered outwardly of the flow distribution tubes 106 cool components within the nacelle housing, including an accessory gearbox 102. As known, the accessory gearbox includes gears which are driven by a drive shaft of a gas turbine engine such as engine 20 of FIG. 1. The accessories may include an oil pump, a fuel pump, etc. The accessory gearbox 102 carries a high cooling load as it generates a good deal of heat.

The air leaving the tubes 106 also cools fluid components such as shown by tube 89 in FIG. 2. The cooling load may be greater near opening 14 of the engine, such as the lowermost portion in the FIG. 2 orientation.

As shown in FIG. 3, the inlet pipe 110 and associated pipe 99 enters a lower portion 114 of the manifold 104, which will be aligned with the gearbox 102. The lower portion 114 will then flow in both clockwise 111 and counterclockwise 117 directions to more remote areas of the interior of the manifold 104. As can be appreciated in FIG. 3, the disclosed manifold 104 may include a radially outer sidewall 199 and a forward or inner end wall 101.

Returning to FIG. 2, portions 132 and 131 of an internal housing may close off the other two walls 200/201 to define an interior flow path within the manifold 104. With wall 200 being a radially inner wall and wall 201 being a rear wall.

At upper locations 116, one can appreciate that a cross-sectional area of the flow path 200 will be smaller than it will be at the lower portion 114. The manifold is asymmetric and in flow cross-section across a circumferential extent about center line A.

This asymmetric sizing provides two functions. First, the greater size may be provided adjacent the area of greatest heat load, as an example, the accessory gearbox 102. In addition, the air at the lower portion 114 will exit through tubes 106 and also flow in directions 111 and 117 towards more remote tubes 106. As such, the volume of air reaching the upper areas 116 will be smaller than the volume of air beginning at lower portion 114. The asymmetric sizing facilitates the flow of the air in those directions.

A valve 300 allows modulation of the nacelle cooling flow to provide performance benefits. As an example, a higher volume of airflow may be allowed by opening the valve 300 during high power flight portions, such as takeoff. On the other hand, lower power portions, such as cruise, may have the volume of airflow reduced dramatically and even stopped. This will result in more efficient use of the bypass airflow. A control 302 is shown schematically for controlling the valve 300.

FIG. 4 shows details of the flow distribution tubes 106. There is an end opening 214 and a plurality of openings 112 in a sidewall 113.

Although an embodiment of this invention has been disclosed, a worker of ordinary skill in this art would recognize that certain modifications would come within the scope of this invention. For that reason, the following claims should be studied to determine the true scope and content of this invention

The invention claimed is:
1. A gas turbine engine comprising:
a core engine housing;
a nacelle positioned radially outwardly of said core engine housing, and an outer bypass housing positioned outwardly of said nacelle;
there are at least one accessory to be cooled positioned in a chamber radially between said core engine housing and said nacelle;
a manifold for delivering cooling air into said chamber, a valve is controlled to modulate the volume of air delivered as cooling air into the chamber from the manifold, and a cross-sectional area of said manifold varying about a circumferential extent;
wherein said valve is open to allow greater airflow to cool said at least one component during high pressure operation of an associated gas turbine engine and is modulated to reduce the airflow at lesser power portions of the gas turbine engine;
wherein said valve is located on an inlet tube leading into said manifold;
wherein a plurality of flow distribution tubes extend from said manifold and into said chamber; and
wherein said manifold is defined by having a radially outer sidewall and inner end wall, with a rear wall and radially inner wall defined by a separate housing member.

2. The gas turbine engine as set forth in claim 1, wherein said inlet tube for said manifold capturing air from a bypass duct defined between said outer bypass housing and said nacelle.

3. The gas turbine engine as set forth in claim 1, wherein said manifold has a greater cross-sectional area associated with a circumferential location where said inlet tube enters said manifold, and having a lesser cross-sectional area at locations spaced circumferentially from said area of greater flow cross-sectional area.

4. The gas turbine engine as set forth in claim 3, wherein said manifold delivering cooling air over at least two of said accessories, with a first of said accessories associated with said area of greater cross-sectional area, and including an accessory gearbox, and a second accessory associated with said area of lesser cross-sectional area, said second accessory being a fluid component.

5. The gas turbine engine as set forth in claim 1, wherein said manifold is defined by having a radially outer sidewall and an inner wall, with a rear wall and a radially inner wall defined by a separate housing member.

6. The gas turbine engine as set forth in claim 1, wherein said inlet tube for said manifold capturing air from a bypass duct defined between said outer bypass housing and said nacelle.

7. The gas turbine engine as set forth in claim 1, wherein said manifold has a greater cross-sectional area associated with a circumferential location where said inlet tube enters said manifold, and having a lesser cross-sectional area at locations spaced circumferentially from said area of greater flow cross-sectional area.

8. The gas turbine engine as set forth in claim 7, wherein said manifold delivering cooling air over at least two of said accessories, with a first of said accessories associated with said area of greater cross-sectional area, and including an accessory gearbox, and a second accessory associated with said area of lesser cross-sectional area, said second accessory being a fluid component.

9. A gas turbine engine comprising:
a core engine housing;
a nacelle positioned radially outwardly of said core engine housing, and an outer bypass housing positioned outwardly of said nacelle;

there being at least one accessory to be cooled positioned in a chamber radially between said core engine housing and said nacelle; and a manifold for delivering cooling air into said chamber, a valve is controlled to modulate the volume of air delivered as cooling air into the chamber from the manifold;

wherein said valve is located on an inlet tube leading into said manifold;

wherein said manifold is defined by having a radially outer sidewall and an inner wall, with a rear wall and a radially inner wall defined by a separate housing member;

wherein said inlet tube for said manifold capturing air from a bypass duct defined between said outer bypass housing and said nacelle; and wherein said manifold has a greater cross-sectional area associated with a circumferential location where an inlet tube enters said manifold, and having a lesser cross-sectional area at locations spaced circumferentially from said area of greater flow cross-sectional area.

10. The gas turbine engine as set forth in claim 9, wherein a plurality of flow distribution tubes extend from said manifold and into said chamber.

11. The gas turbine engine as set forth in claim 9, wherein said manifold delivering cooling air over at least two of said accessories, with a first of said accessories associated with said area of greater cross-sectional area, and including an accessory gearbox, and a second accessory associated with said area of lesser cross-sectional area, said second accessory being a fluid component.

12. A gas turbine engine comprising:

a core engine housing;

a nacelle positioned radially outwardly of said core engine housing, and an outer bypass housing positioned outwardly of said nacelle;

there being at least one accessory to be cooled positioned in a chamber radially between said core engine housing and said nacelle;

a manifold for delivering cooling air into said chamber, a valve is controlled to modulate the volume of air delivered as cooling air into the chamber from the manifold, and a cross-sectional area of said manifold varying about a circumferential extent;

wherein said inlet tube for said manifold capturing air from a bypass duet defined between said outer bypass housing and said nacelle; and wherein said manifold has a greater cross-sectional area associated with a circumferential location where said inlet tube enters said manifold, and having a lesser cross-sectional area at locations spaced circumferentially from said area of greater flow cross-sectional area.

13. The gas turbine engine as set forth in claim 12, wherein said manifold delivering cooling air over at least two of said accessories, with a first of said accessories associated with said area of greater cross-sectional area, and including an accessory gearbox, and a second accessory associated with said area of lesser cross-sectional area, said second accessory being a fluid component.

* * * * *